Figure 1:
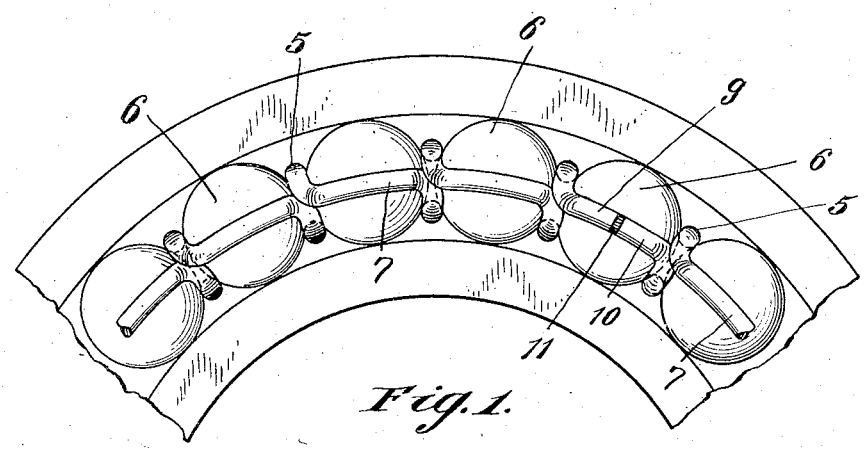

E. M. LOWY.
SEPARATOR CAGE FOR BALL BEARINGS.
APPLICATION FILED DEC. 16, 1911.

1,170,916.

Patented Feb. 8, 1916.

UNITED STATES PATENT OFFICE.

EMIL M. LOWY, OF NEW YORK, N. Y.

SEPARATOR-CAGE FOR BALL-BEARINGS.

1,170,916.  Specification of Letters Patent.  Patented Feb. 8, 1916.

Application filed December 16, 1911. Serial No. 666,087.

*To all whom it may concern:*

Be it known that I, EMIL M. LOWY, a subject of the King of Hungary, at present residing in the city of New York, borough of Manhattan, county and State of New York, have invented certain new and useful Improvements in Separator-Cages for Ball-Bearings, of which the following is a full, clear, and exact specification.

This invention relates to separator-cages for bearing balls.

The object of the invention is to provide a device for elastically separating the balls of a race of balls with a minimum amount of space for preventing a ball, upon release from the load, striking the neighboring ball, and for placing the maximum number of balls in the load-carrying angle, producing a separator or cage having great flexibility, and a flexible separator-cage which, with its complement of balls, will constitute a self-contained structure.

In the drawings accompanying and forming a part of this specification, one practicable embodiment of a form of the invention is illustrated, in which drawings—

Figure 2:
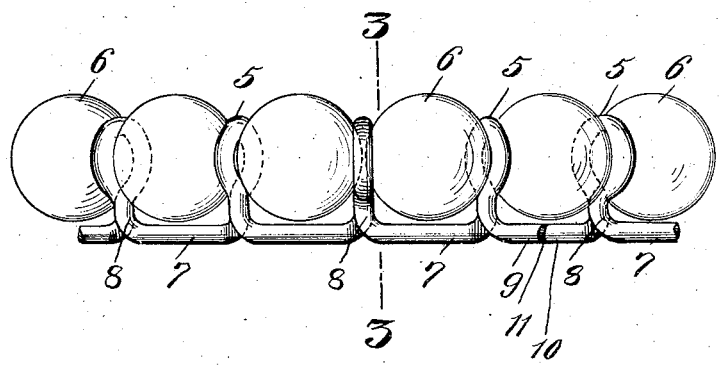
Figure 3:
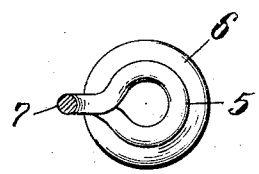

Figure 1 represents a side view of a portion of a radial bearing equipped with the present improvement. Fig. 2 is an edge view of a portion of the separator with balls in position, and Fig. 3 is a cross-sectional view taken on a plane at about the line 3—3 of Fig. 2.

The separator-cage in the present illustration is shown composed of a wire provided with a series of loops integrally connected therewith. There is shown a wire having a convolution or loop 5, located in position for interposition between two adjacent balls 6. This loop is of such dimension that in a race of given size the maximum number of balls may be placed and kept separated one from another during the running operation, and each ball from striking its neighbor when released from the load. The loop or convolution 5, is of sufficient radial elasticity that upon strain being applied to the adjacent ball, the loop will somewhat expand and cushion the blow or strain, as the case may be, applied to it by the ball, and bring the ball yieldingly to a position of rest relative to its augmented movement when driven from its normal position, and the elasticity of the loop will restore the ball to its normal position. The loops 5, are shown connected by connector-portions 7, which in themselves are flexible or elastic. The loops are shown elastically connected at 8 to the connectors 7. The entire series or ring of balls with the separator, which then acts as a cage, will be a self-contained but elastic structure.

The flexibility of the cage as a whole may be regulated by fastening the adjacent ends 9, 10, of the wire together by some suitable weld or with solder 11. This will make the cage comprise an endless coil, as it were, having a series of convolutions located in position for interposition between the balls and integral spanners or spacers uniting the convolutions.

By this improvement it will be possible and feasible to place more balls in a race of given size than has heretofore been possible with spaced-apart balls. This will enable a greater number of balls to be in the load-carrying angle of a radial bearing. In the thrust bearing, by having a maximum number of balls, the load-carrying capacity will also be increased. This improvement also permits the balls to be so closely placed together in the race that the balls are nearly in contact with one another, but are positively separated by elastic means in such manner that one ball is not permitted to bear against or strike another ball when released from the load.

It is a well known fact that the glass hard balls which are generally used in this type of ball bearing are but little affected by the wear of the attrition to which they are subjected, but that they are injured rather by blows, which blows are incessant during the running of a radial bearing. As each ball passes out from under the load position, it will be violently projected against the ball which has immediately preceded it. The continuance of this hammering action, one ball upon the other, will make equatorial grooves in the balls and will also at times fracture the balls. For preventing this the balls are separated.

The balls are interchangeable, either the entire set or any one or more individuals, without injury to the separator-cage or the balls.

In this improvement upon abnormal strain the yieldability of the cage will be distributed among several adjacent loops and the sum of their elasticity will act to establish normal conditions.

The separator is preferably made of some metal which will not amalgamate with the metal of the balls under the heat of friction. The separator is preferably made of metal which may be hardened. This will minimize friction.

It will be understood that the form of the invention illustrated and specifically described is illustrative of the invention and that changes may be made within the scope of the claims without departing from the spirit of my invention.

Having thus described my invention, what I claim and desire to secure by Letters Patent is:

1. The combination with a series of balls, of a separator-cage therefor, said separator-cage being formed of a single length of wire bent and formed into retaining loops or rings being disposed at equi-distant points along its length the eye of each ring adapted to form a seat for two adjacent balls.

2. The combination with a series of balls, of a one piece separating member therefor comprising a plurality of eyes or loops, each eye or loop providing a seat for two adjacent balls, each ball contacting with an annular peripheral portion of an eye or loop.

3. The combination with a series of balls, of a one piece separator-cage comprising a series of elastic wire loops, said loops being respectively disposed between the balls and each loop contacting with two adjacent balls and providing seats therefor.

4. A one piece annular separator cage for balls formed with integral connected rings of circular cross-section, each ring constituting a separating and seat member for adjacent balls.

5. The annular separator-cage for balls formed of flexible wire and having integral rings adapted to be interposed between two adjacent balls to form a separating and seat member therefor, each ring being so positioned with relation to the balls that an outer peripheral portion of two balls will be centered and seated within the eye of each ring but separated from each other.

6. An annular separator cage for balls formed in one piece bent into a plurality of connected rings, equi-distant from each other, each ring being of circular cross section and constituting a separating and seat member for adjacent balls whereby a ball when positioned in the cage is in engagement with annular peripheral portions of adjacent rings, the zone of contact between ball and ring constituting the meeting portions of the convexed surfaces thereof.

7. The combination with a series of balls, of a one piece separator-cage comprising a series of integral loops, the diameter of said loops being relatively smaller than the diameter of the balls and each loop being disposed between and separating adjacent balls so that said balls will not contact with each other during normal operation.

8. The combination with a series of balls, of a separator-cage formed of wire bent in the form of loops having a diameter relatively smaller than the diameter of the balls, each loop of the series being disposed between a pair of balls and separating them from contact with each other.

In witness whereof I have hereunto set my hand in the presence of two subscribing witnesses.

EMIL M. LOWY.

Witnesses:
CHAS. LYON RUSSELL,
WM. C. DUNN.